United States Patent [19]

Weisbecker

[11] 3,970,998

[45] July 20, 1976

[54] MICROPROCESSOR ARCHITECTURE

[75] Inventor: Joseph A. Weisbecker, Cherry Hill, N.J.

[73] Assignee: RCA Corporation, New York, N.Y.

[22] Filed: Oct. 15, 1974

[21] Appl. No.: 514,937

[52] U.S. Cl. .............................................. 340/172.5
[51] Int. Cl.² ........................................ G06F 15/20
[58] Field of Search .................................. 340/172.5

[56] References Cited
UNITED STATES PATENTS

| | | | |
|---|---|---|---|
| 3,215,987 | 11/1965 | Terzian | 340/172.5 |
| 3,370,274 | 2/1968 | Kettley | 340/172.5 |
| 3,462,742 | 8/1969 | Miller | 340/172.5 |
| 3,518,632 | 6/1970 | Threadgold | 340/172.5 |
| 3,702,988 | 11/1972 | Haney | 340/172.5 |
| 3,748,649 | 6/1973 | McGowen | 340/172.5 |
| 3,815,099 | 6/1974 | Cohen | 340/172.5 |

*Primary Examiner*—Gareth D. Shaw
*Assistant Examiner*—James D. Thomas
*Attorney, Agent, or Firm*—Carl M. Wright; Edward J. Norton

[57] ABSTRACT

Register-oriented, parallel-organized microprocessor architecture having a register matrix for storage of memory addresses used to address external devices and instruction operands, having working registers for identifying a desired register from the matrix for a given operation, and having two buses for the distribution of data and addresses. Means are provided for operating on the contents of the registers comprising the register matrix when used as instruction operands to permit operations on frequently-used data at a speed not limited by external access requirements.

4 Claims, 1 Drawing Figure

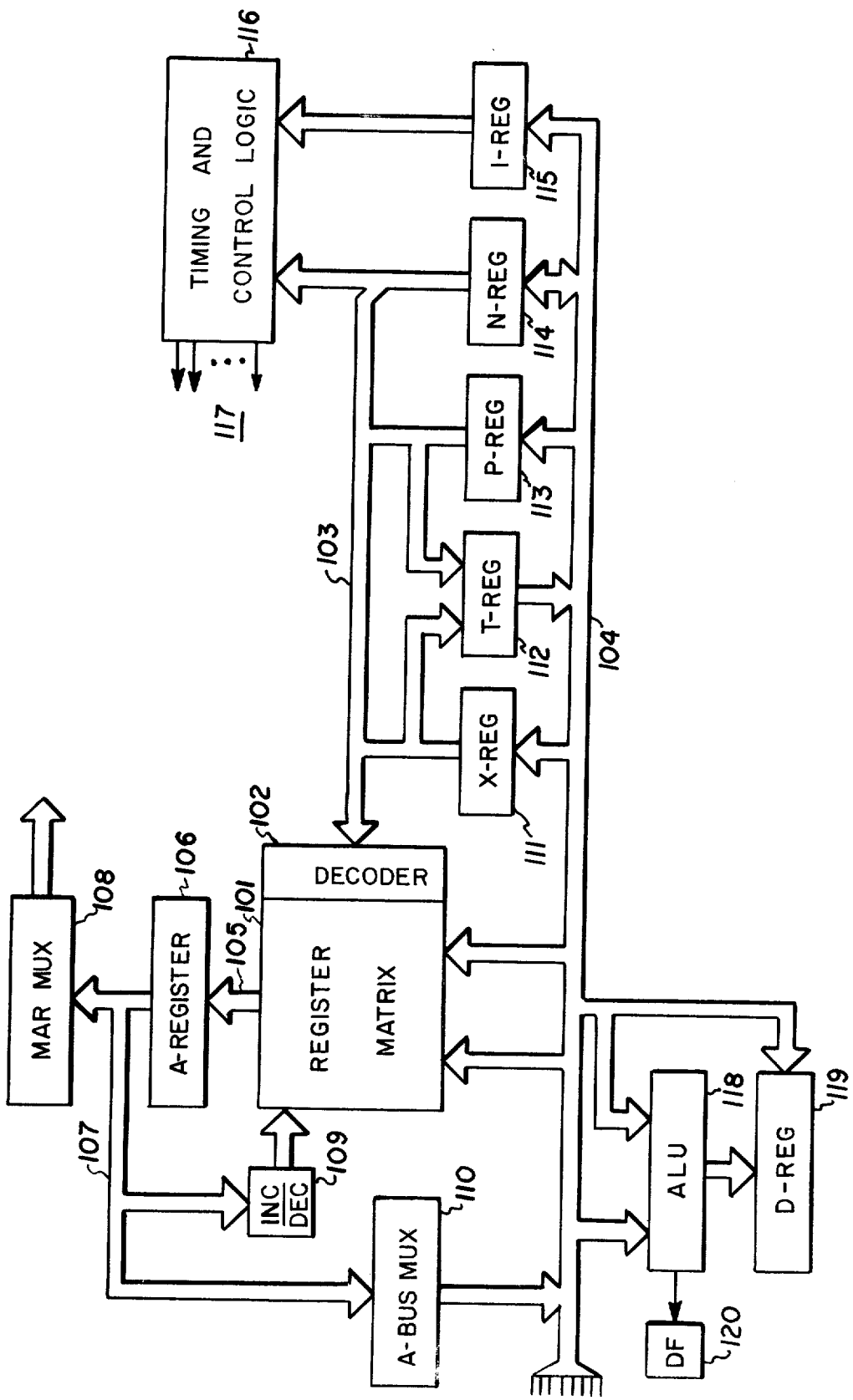

MICROPROCESSOR ARCHITECTURE

BACKGROUND OF THE INVENTION

This application is related to U.S. Pat. No. 3,798,615 by the same inventor and assigned to the same assignee as this application. The material therein is hereby incorporated by reference.

1. Field of the Invention

This invention relates to microprocessors. A microprocessor is a device capable of performing arithmetic, logical, and decision making operations under the control of a set of stored instructions, but of small size, capable of being manufactured on a few (not more than four) integrated circuits. The instructions are stored either temporarily or permanently in some type of memory device. The microprocessor is capable of communicating with a set of peripheral devices by means of some well defined bidirectional structure. The operation of a microprocessor is often slow when compared to large computing devices, but it has the advantage of being implementable on one integrated circuit chip and of being relatively inexpensive.

2. Description of the Prior Art

Large scale integration techniques have made it possible to produce in a small space, logic circuits which formerly required thousands of discrete devices. When data processing and electronic computer systems are reduced to a few LSI circuits, the organization is usually a scaled down version of a large scale data processing system. One of the problems encountered when putting a data processing system on a few integrated circuits is the limitation on the number of external connections that can be made to the integrated circuit.

The invention disclosed is a microprocessor organization that is suitable for implementation on a single integrated circuit requiring a minimum of external connections consistent with an acceptable operating speed.

SUMMARY OF THE INVENTION

An electronic control system is provided having a first and second bus with a plurality of registers connected thereto. There is a first register for receiving a control word from the second bus, which register is coupled to a control means providing suitable signals for controlling the sequential operation of the processor. There is also provided a word storage memory containing several words, including a decoder for addressing one of the stored words to be read out or to be stored from input signals. A second register is provided for storing the value of the selected register read from the word storage and the contents of the second register can be modified and returned to the same location in the word storage. The second register is capable of being coupled to the first bus. Third, fourth, and fifth registers are provided for indicating which register is to be selected from the word storage and a sixth register is provided for temporary storage of the contents of the third and fourth registers. The fifth and sixth registers can be coupled to the second bus.

BRIEF DESCRIPTION OF THE DRAWING

The sole drawing is a block diagram of a preferred embodiment of the invention.

DESCRIPTION OF THE PREFERRED EMBODIMENT

In the following description, certain values will be assigned to the width of registers and buses. The width of a register or bus indicates the number of bits the register or bus can handle in parallel. The widths given in this detailed description are for illustrative purposes only and are not intended to be limiting.

The drawing is an illustration of the general architecture of the microprocessor. The register matrix 101 can be considered an array of 16 16-bit registers which are addressed by the X-register 111, P register 113, or the N-register 114, each of which is four bits wide.

The I-register 115 (which is four bits wide) and the N-register 114 store the instruction being executed as fetched from an external main memory. The operation field of the instruction is stored in the I-register 115 and the address field, in the N-register 114. The data enters the microprocessor via an eight bit wide bus 104. Only one memory read cycle is required to fetch an instruction to the I- and N-registers.

Signals from the I- and N-registers 115 and 114 are coupled to a timing and control circuit 116 which provides a plurality of output control signals 117. Some of these control signals are applied to external devices not shown for controlling input/output operations including memory read and write operations. Others of the control signals 117 are understood to be applied to the various registers and circuits shown in the drawing. The gating of registers to buses and buses to registers are controlled by the output control signals 117 from the timing and control logic 116 which depend on the contents of the I-register 115 and the N-register 114.

The P-register 113 stores a four bit word which is applied via a four bit wide bus 103 to a decoder 102 which selects one of the 16 registers in the register matrix 101. The register selected by the P-register 113 indicates the address of the next instruction to be executed. In other words, the P-register 113 contains a hexadecimal character which specifies the location of the address of the next instruction.

When the current instruction has been executed, the P-register 113 is gated to the bus 103 and, by means of the decoder 102 and circuitry contained in the register matrix 101, the output signals from the selected register are stored in an A-register 106 via a 16 bit wide bus 105. The 16 bits stored in the A-register 106 can be applied directly to an external memory as a 16 bit address or, to save pin allocations on the integrated circuit, the contents of the A-register can be multiplexed to the output bus by means of a multiplexor 108. The memory address multiplexor 108 can be used to make external connections to each group of eight of the 16 output signals from the A-register 106 to the output bus in two successive time frames.

When the information is available from the memory, it is coupled to the microprocessor via the bus 104. The instruction is gated into the I- and N-registers as previously described.

An example of the instructions that can be performed are shown in Table 1. The notation used in Table I is as follows. The notation R(N) + 1 such as shown for the first instruction, INCREMENT REGISTER, is interpreted to indicate that the register from the register matrix 101 which is addressed by the N-register 114 is read out, incremented by a value of one, and replaced in the same location. To understand the execution of the first instruction, INCREMENT REGISTER, assume that register 8 in the register matrix 101 is to be incremented by a value of one. The operation code stored in the I-register 115 will be 0001 in binary notation and the address field of the instruction stored in the N-register 114 is 1000. When the instruction is retrieved from the main memory and brought into the microprocessor via the bus 104, the operation code 0001 is gated into the I-register 115 and the address portion 1000 is gated into the N-register 114.

In response to the operation code, the timing and control logic 116 produces a suitable set of control signals 117 to perform the following sequence of events. The contents of the N-register 114 are gated via the bus 103 to the decoder 102. The decoder 102 causes register 8 to be read from the register matrix 101 via the bus 105 to the A-register 106. The contents of the A-register are then gated via a 16 bit wide bus 107 to an incrementer/decrementer 109 which causes a value of one to be added to the contents of the A-register 106. The result is then stored in the register matrix 101 at register 8's location. This completes the operation and the next instruction is then brought from the main memory.

The next instruction in Table I, DECREMENT REGISTER, operates in a similar way, the difference being that the incrementer/decrementer 109 receives a control signal indicating that a one is to be subtracted from the contents of the A-register 106.

The third instruction in Table I, R0 to D, is a transfer of the least significant eight bits of a register to an eight bit wide D-register 119. The register addressed by the N-register 114 is read from the register matrix 101 into the A-register 106. The contents of the A-register 106 are then applied to an A-bus multiplexor 110. The multiplexor 110 receives a control signal that causes the least significant eight bits from the A-register 106 to be gated to the bus 104. The D-register 119 receives a control signal to store the data on the bus 104.

The fourth operation in Table I, R1 to D, is executed in a similar fashion except that the most significant eight bits from the A-register 106 are gated to the bus 104 via the A-bus multiplexor 110.

In general, R0(N) refers to the least significant eight bits of the register in the register matrix 106 addressed by the N-register. R1(N) refers to the eight most significant bits of the register.

As explained above, the registers stored in the register matrix 101 are used to address the main memory. The notation M(R(X)) indicates the main memory contents at the address specified by the register from the register matrix 101 addressed by the X-register 111. The P-register 113 and the N-register 114 are also used to address a register in the register matrix 101 to be used as a memory address.

The next instruction in Table I, D0 to R00, places the four least significant bits of the D-register 119 into the four least significant bits of the register in the register matrix 101 specified by the N-register 114. This instruction is especially useful for performing table-look up functions.

The IDLE instruction is used as a halt. Gating M(R(N)) to the bus permits the memory contents to be displayed, e.g., for purposes of identifying the halt. The system remains in IDLE until an external interrupt signal or a Direct Memory Access signal is received.

The next four instructions are self-explanatory in Table I.

Some of the operation codes in Table I consist of two hexadecimal digits (eight bits). In such cases, the N-register contents are also used to control the timing and control logic 116. In the execution of eight bit instructions, the N-register is not used to specify an address.

To execute the arithmetic and logical instructions, an arithmetic logic unit (ALU) 118 is provided. The D-register 119 performs the function of an accumulator, which is well known known in the art. The input signals to the ALU 118 are the signals on the bus 104 and the signals from the D-register 119.

A single bit overflow register (DF) 120 is provided to store the carry out during ADD/SUBSTRACT or the most significant bit during SHIFT RIGHT from the ALU 118.

Usually, the memory operand is located by the X-register 111 during arithmetic or logical instructions. The memory operand is read from the main memory, applied to the bus 104, and to an input side of the ALU 118. The contents of the D-register 119 are gated to the ALU input side. The result from the output side of the ALU 118 is stored in the D-register 119.

The arithmetic immediate and logical immediate instructions, F8 through FD and FF, use the memory data specified by the P-register 113. The R(P) register is also incremented by one. This permits data to be stored in the memory location immediately following the instruction. This facilitates the use of constants in a program stream.

The TEST and BRANCH instruction, operation code 0011, performs the decision making operations. The N-field of the instruction specifies the test to be made. The contents of the D-register 119 can be tested as can the condition of the DF-register 120. Four External Flags, EF1–EF4, can also be tested. An external flag is simply a signal brought into the microprocessor for testing. It permits external conditions to determine alternate program paths.

When the condition tested is true, the least significant eight bits of the location following the instruction are placed in the least significant eight bit position of the register R(P). This effects a jump to another portion of the program.

If the condition tested is not true, the instruction following the next location is executed. That is R(P) + 1 skips the next instruction location. When N = 8, the next instruction is unconditionally skipped.

The I/O transfer instruction, 0110, transfers data from the memory M(R(X)) to an extenal device or accepts data from an external device to be stored in the memory M(R(X)). The bus 104 can be used to route the data transfers.

The advantages of the architecture shown in the drawing become more apparent by considering Table I in its entirety. One advantage is the ease with which a transfer of control can be effected. This is described in greater detail in U.S. Pat. No. 3,798,615 by the same inventor and assigned to the same assignee as this application.

Another advantage of this architecture is the ability to operate on the registers in the register matrix 101 without requiring outside access so that the speed of such operations will be limited only by the circuitry of the microprocessor itself.

Another important advantage of the architecture is the ease with which interrupts can be handled either singly or in groups, that is, multiple interrupts. In the event of an interrupt, the contents of the P-register 113 and the contents of the X-register 111 are stored in an eight bit wide T-register 112. The T-register 112 is coupled to the bus 104 to permit its contents to be stored in the main memory at the location indicated by the register in the register matrix 101 which is specified by the X-register 111. The X-register setting for storage of the T-register 112 is not the same X-register setting stored in the T-register since the present X-register contents have been loaded by a subsequent instruction. For example, when a subroutine is to be performed, the LOAD X instruction causes the contents of the N-register 114 to be gated to the X-register 111. The SAVE PRE-INTERRUPT PROGRAM STATE instruction causes the contents of the T-register 112 to be stored in the main memory at the location indicated by the register from the register matrix 101 designated by the X-register 111, M(R(X)). This permits an almost unlimited nested subroutines, the limits being set by the size of the main memory.

The instruction set illustrated by Table I also provides for the extensive use of interpretive subroutine matrix instructions.

Various modifications to the system described and illustrated to explain the concept and mode of practicing the invention can be made by those of ordinary skill in the art within the principle or scope of the invention as expressed in the appended claims.

What is claimed is:

1. A microprocessor architecture comprising, in combination:

first bus means for providing external device addresses;

second bus means for providing data signals to, and accepting data signals from external devices;

first register means for receiving and storing a control word from the second bus;

control means responsive to the word stored in said first register means for providing a sequence of

TABLE I

| MICROPROCESSOR INSTRUCTION REPERTOIRE | | |
|---|---|---|
| Instruction | Inst. Code (Hex) | Function |
| INCREMENT REGISTER | 1 | $R(N) + 1$ |
| DECREMENT REGISTER | 2 | $R(N) - 1$ |
| R0 to D | 8 | $R0(N) \rightarrow D$ |
| R1 to D | 9 | $R1(N) \rightarrow D$ |
| D to R0 | A | $D \rightarrow R0(N)$ |
| D to R1 | B | $D \rightarrow R1(N)$ |
| D0 to R00 | C | $D0 \rightarrow R00(N)$ |
| IDLE | 0 | IDLE; $M(R(N)) \rightarrow$ BUS |
| MEMORY TO D | 4 | $M(R(N)) \rightarrow D; R(N) + 1$ |
| D TO MEMORY | 5 | $D \rightarrow M(R(N))$ |
| LOAD P | D | $N \rightarrow P$ |
| LOAD X | E | $N \rightarrow X$ |
| CHANGE STATE AND RESET INTERRUPT MASK | 70 | $M(R(X)) \rightarrow X,P;R(X)+1$; RESET IM |
| CHANGE STATE AND SET INTERRUPT MASK | 71 | $M(R(X)) \rightarrow X,P;R(X)+1$;SET IM |
| SAVE PREINTERRUPT PROGRAM STATE | 78 | $T \rightarrow M(R(X))$ |
| INDEXED MEMORY TRANSFER TO D | F0 | $M(R(X)) \rightarrow D$ |
| OR | F1 | $M(R(X)) \lor D \rightarrow D$ |
| AND | F2 | $M(R(X)) \land D \rightarrow D$ |
| EXCLUSIVE OR | F3 | $M(R(X)) \veebar D \rightarrow D$ |
| ADD | F4 | $M(R(X)) + D \rightarrow D$ |
| SUBTRACT | F5 | $M(R(X)) - D \rightarrow D$ |
| SHIFT RIGHT | F6 | SHIFT D, 1BR$\rightarrow$ DF |
| REVERSE SUBTRACT | F7 | $D - M(R(X)) \rightarrow D$ |
| DATA IMMEDIATE TRANSFER TO D | F8 | $M(R(P)) \rightarrow D;R(P) + 1$ |
| OR IMMEDIATE | F9 | $M(R(P)) \lor D \rightarrow D;R(P) + 1$ |
| AND IMMEDIATE | FA | $M(R(P)) \land D \rightarrow D;R(P) + 1$ |
| EXCLUSIVE OR IMMEDIATE | FB | $M(R(P)) \veebar D \rightarrow D;R(P) + 1$ |
| ADD IMMEDIATE | FC | $M(R(P)) + D \rightarrow D;R(P) + 1$ |
| SUBTRACT IMMEDIATE | FD | $M(R(P)) - D \rightarrow D;R(P) + 1$ |
| REVERSE SUBT. IMMEDIATE | FF | $D - M(R(P)) \rightarrow D;R(P) + 1$ |

| Instruction | Inst. Code (Hex) | Test Field (Hex) | Function |
|---|---|---|---|
| TEST AND BRANCH | 3 | 0 | $M(R(P)) \rightarrow R0(P)$ |
| | | 1 | $M(R(P)) \rightarrow R0(P)$IF $D \neq 0/R(P)+1$ |
| | | 2 | $M(R(P)) \rightarrow R0(P)$IF $D \neq 0/R(P)+1$ |
| | | 3 | $M(R(P)) \rightarrow R0(P)$IF DF $\neq 1/R(P)+1$ |
| | | 4 | $M(R(P)) \rightarrow R0(P)$IF EF1=1/R(P)+1 |
| | | 5 | $M(R(P)) \rightarrow R0(P)$IF EF2=1/R(P)+1 |
| | | 6 | $M(R(P)) \rightarrow R0(P)$IF EF3=1/R(P)+1 |
| | | 7 | $M(R(P)) \rightarrow R0(P)$IF EF4=1/R(P)+1 |
| | | 8 | $R0(P) + 1$ (SKIP) |
| | | B | $M(R(P)) \rightarrow R0(P)$IF DF=0/R(P)+1 |
| | | C | $M(R(P)) \rightarrow R0(P)$IF EF1=0/R(P)+1 |
| | | D | $M(R(P)) \rightarrow R0(P)$IF EF2=0/R(P)+1 |
| | | E | $M(R(P)) \rightarrow R0(P)$IF EF3=0/R(P)+1 |
| | | F | $M(R(P)) \rightarrow R0(P)$IF EF4=0/R(P)+1 |
| Unused TEST CONDITION SHOULD BE CONSIDERED ILLEGAL. | | | |
| I/O TRANSFER | 6 | 0-7 | $M(R(X)) \rightarrow I/O;R(X) + 1$ |
| | | 8-F | $I/O \rightarrow M(R(X))$ | control signals to execute a predetermined operation indicated by the word in said first register means;

word storage means for storing a plurality of words, including input means, output means, and decoding means for decoding a plurality of signals to address one of said plurality of words to be read out to said output means in response to one of said control signals and to address the location at which a word is to be stored from said input means in response to another one of said control signals;

means responsive to one of said control signals for coupling said second bus means to the input means of said word storage means;

second register means for storing a word from the output means of said word storage means in response to one of said control signals;

modification means responsive to one of said control signals and to the contents of said second register for changing the value of the word stored in said second register including means for coupling said modification means to the input means of said word storage means;

means responsive to one of said control signals for coupling said second register means to said first bus means;

third, fourth, and fifth register means, each having input means and output means, coupled to receive signals from said second bus means for selectively supplying said plurality of signals to the decoding means of said word storage means in response to one of said control signals;

sixth register means responsive to one of said control signals for receiving and storing the contents of said third and fourth register means;

means responsive to one of said control signals for coupling said sixth register means to said second bus means; and means responsive to one of said control signals for coupling the output means of said fifth register means to said second bus means.

2. The invention claimed in claim 1 including
arithmetic logic means having first and second input means and output means for combining signals from the first and second input means in response to one of said control signals to provide a result signal to said arithmetic logic output means;

means responsive to one of said control signals for coupling said second bus to the first input means of said arithmetic logic means;

seventh register means, havng input means and output means, for storing the result signal from said arithmetic logic means;

means responsive to one of said control signals for coupling the output means of said arithmetic logic means to the input means of said seventh register means;

means responsive to one of said control signals for coupling the output means of said seventh register means to said second bus means; and means responsive to one of said control signals for coupling the output means of said seventh register means to the second input means of said arithmetic logic means.

3. The invention as claimed in claim 2 including means for coupling said second register means to said second bus means in response to one of said control signals.

4. The invention as claimed in claim 2 including means responsive to one of said control signals for coupling the second bus means to the input means of said seventh register means.

* * * * *